Nov. 17, 1931.  J. BORNSTEIN  1,832,083
WIPER MECHANISM FOR WINDSHIELDS AND THE LIKE
Filed Aug. 21, 1929    5 Sheets-Sheet 1
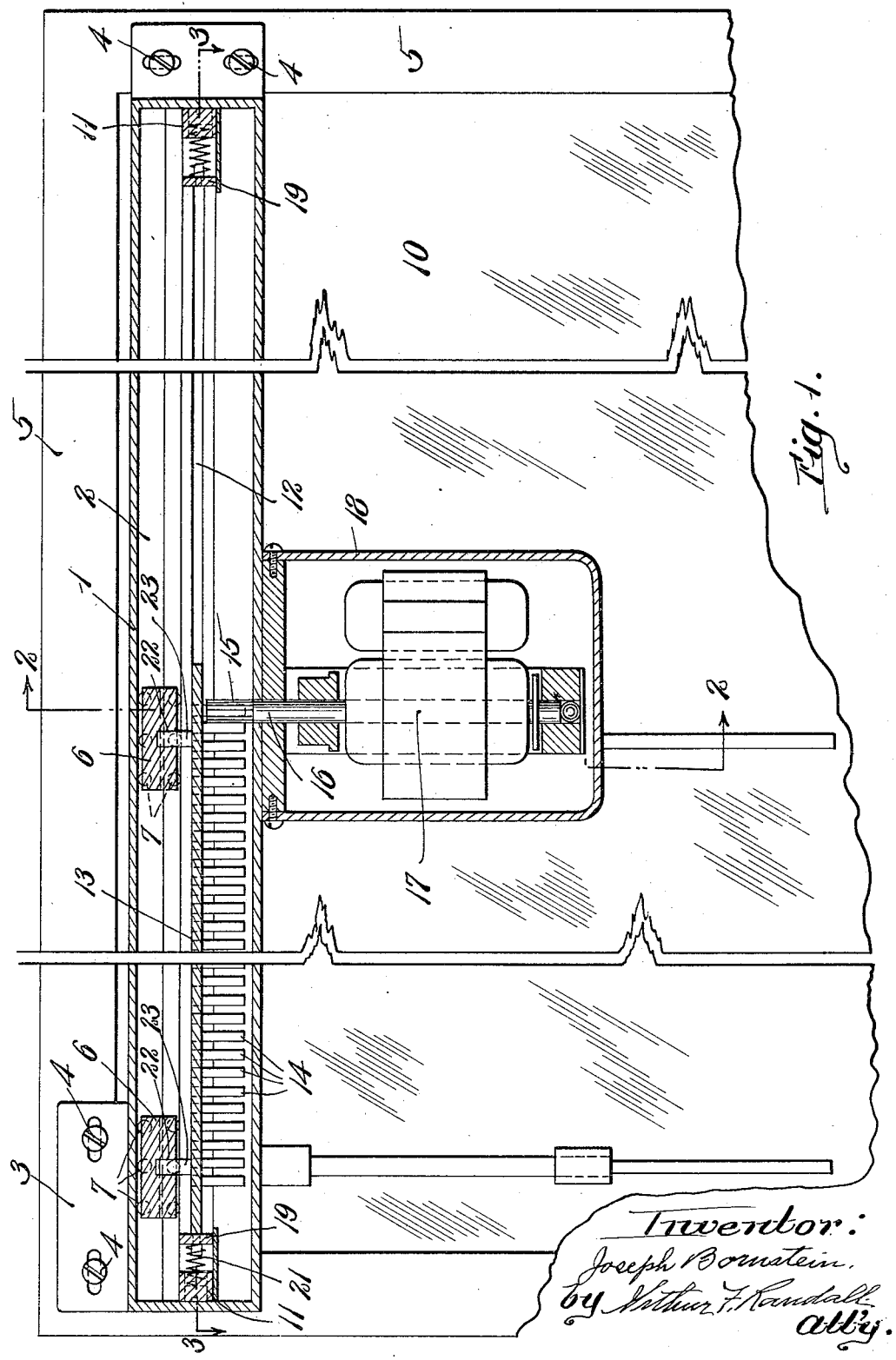

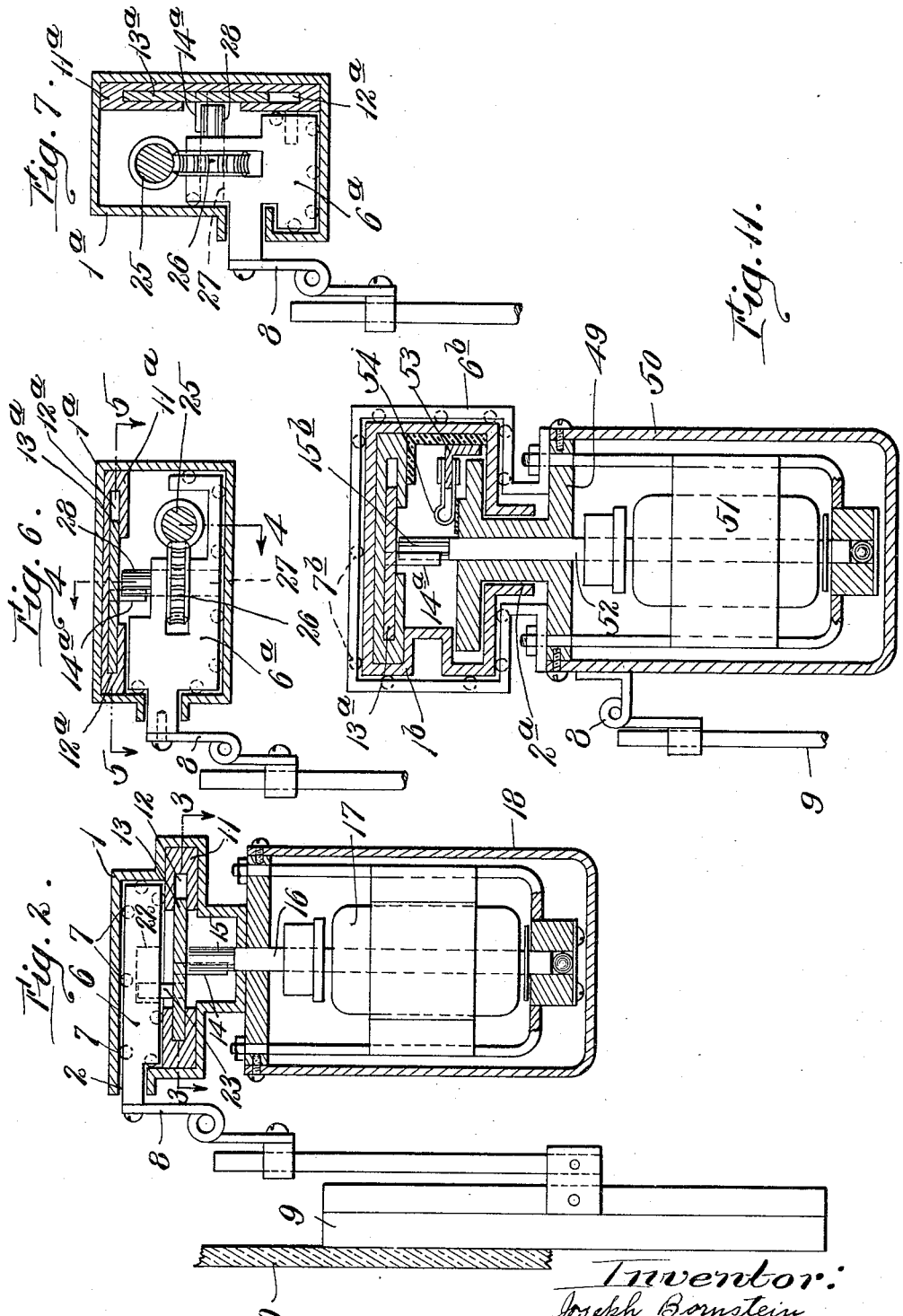

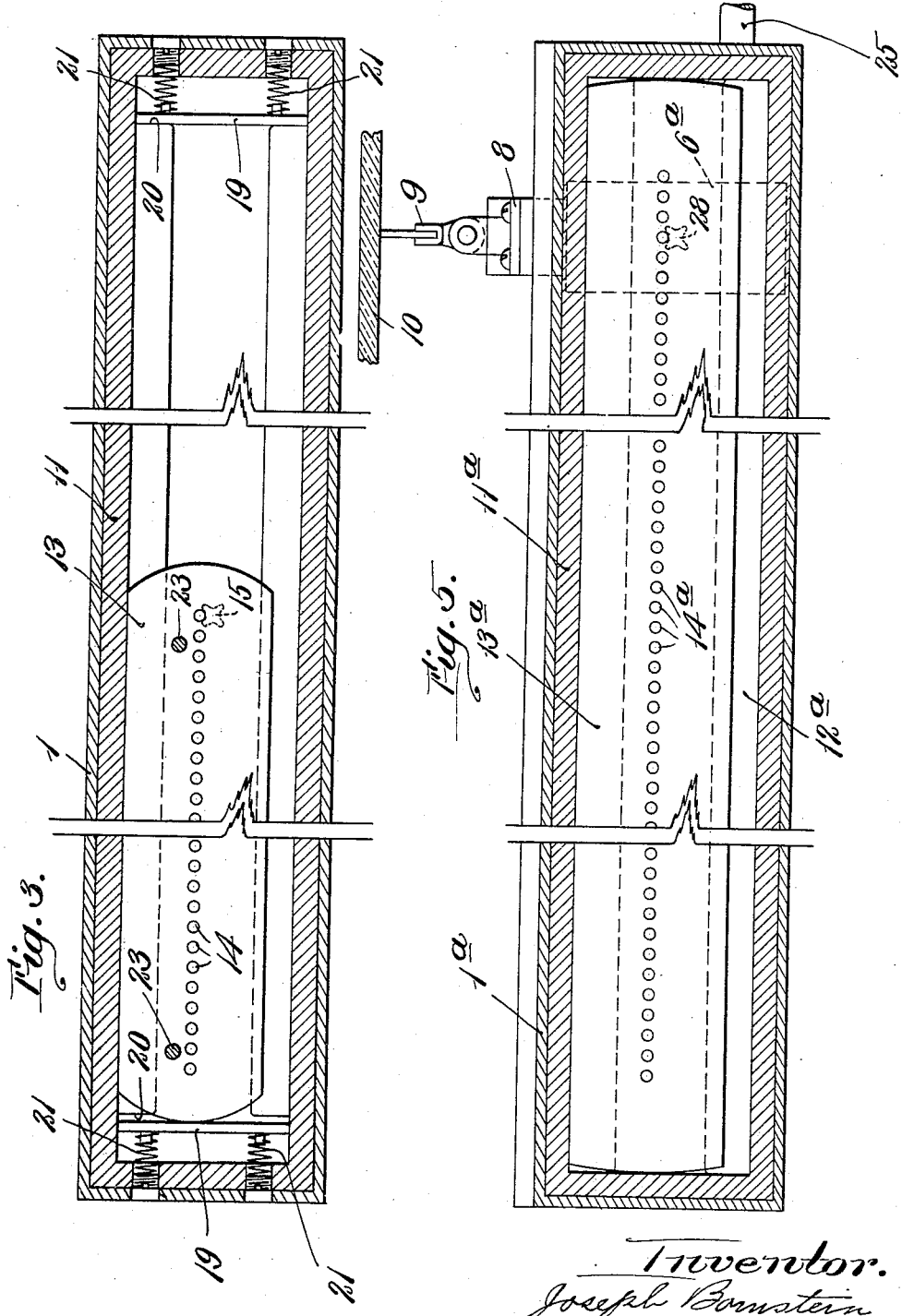

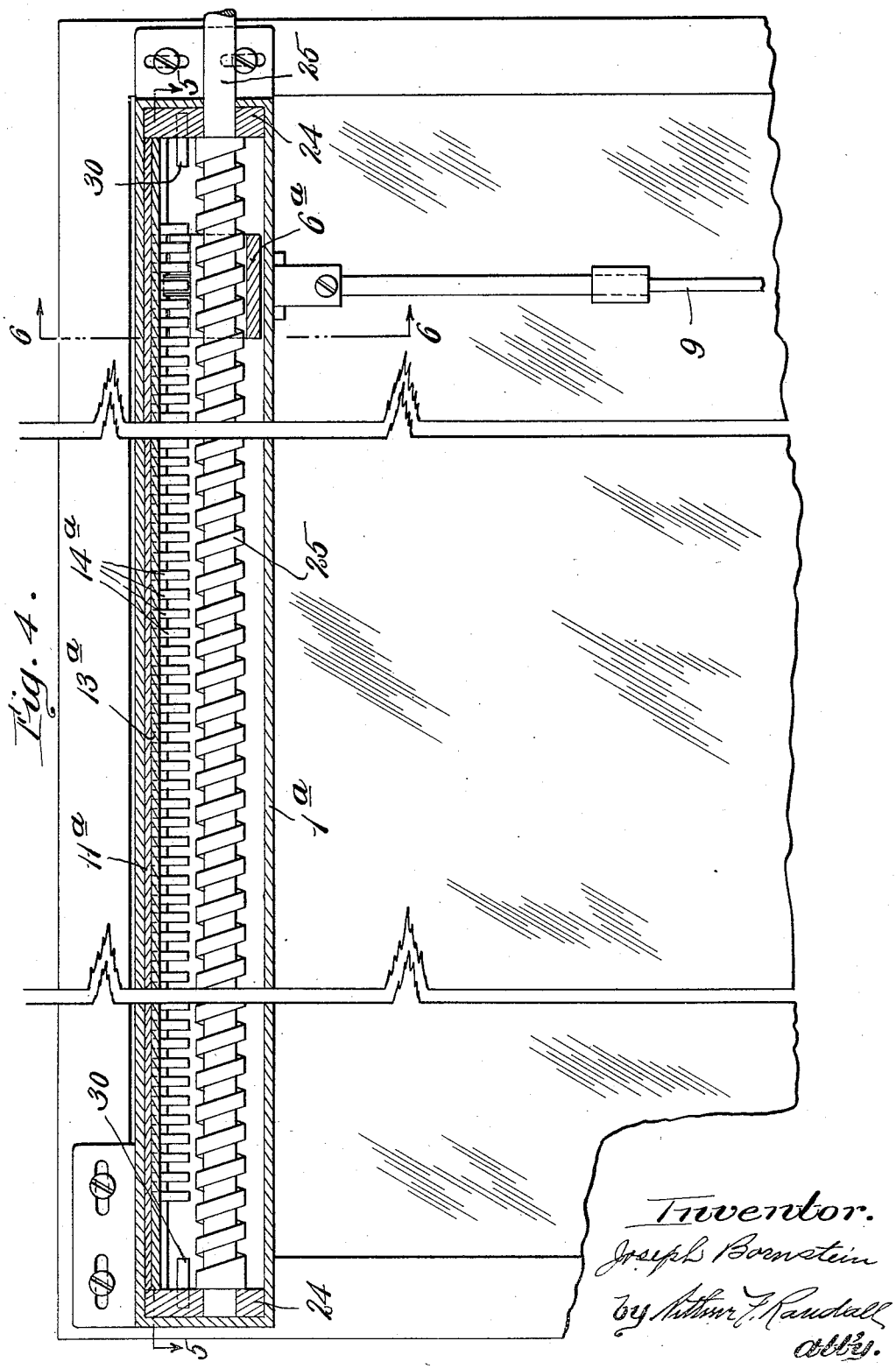

Nov. 17, 1931.   J. BORNSTEIN   1,832,083
WIPER MECHANISM FOR WINDSHIELDS AND THE LIKE
Filed Aug. 21, 1929   5 Sheets-Sheet 5
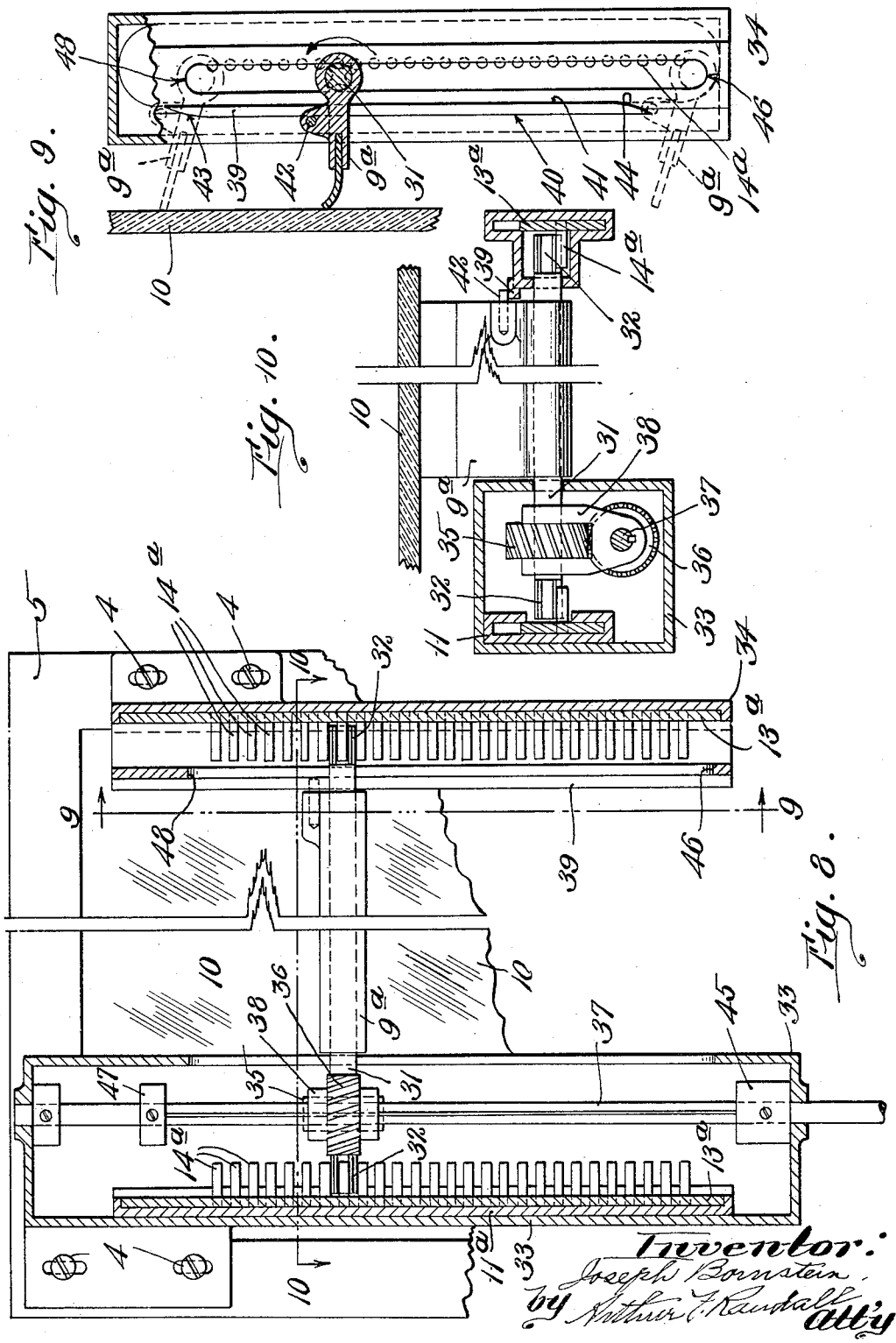

Patented Nov. 17, 1931

1,832,083

UNITED STATES PATENT OFFICE.

JOSEPH BORNSTEIN, OF BOSTON, MASSACHUSETTS, ASSIGNOR TO LOUIS BORNSTEIN, OF QUINCY, MASSACHUSETTS

WIPER MECHANISM FOR WINDSHIELDS AND THE LIKE

Application filed August 21, 1929. Serial No. 387,539.

My invention relates to wiper or cleaning mechanisms for windshields, windows and the like, and it has for its object to improve the construction thereof and to provide a mechanism of this class which will be of simple, efficient and inexpensive construction.

To these ends I have provided a mechanism of the class described having the peculiar features of construction and mode of operation set forth in the following description, the several novel features of the invention being particularly pointed out and defined in the claims at the close thereof.

In the accompanying drawings:—

Figure 1 is a front elevation, partly in section, of the upper portion of a windshield having applied thereto a wiper or cleaning mechanism constructed in accordance with my invention.

Figure 2 is a section on line 2—2 of Fig. 1.

Figure 3 is a section on line 3—3 of Fig. 1.

Figure 4 is a front elevation, partly in section, of the upper portion of a windshield having applied thereto a wiper or cleaning mechanism embodying another form of my invention.

Figure 5 is a section on line 5—5 of Fig. 4.

Figure 6 is a section on line 6—6 of Fig. 4.

Figure 7 illustrates a modification of the form or type of mechanism shown in Figs. 4 to 6, inclusive.

Figures 8, 9 and 10 illustrate a further modification, Fig. 9 being a section on line 9—9 of Fig. 8 and Fig. 10 being a section on line 10—10 of Fig. 8.

Figure 11 is a modification hereinafter described.

The form of my invention illustrated in Figs. 1, 2 and 3 includes a frame comprising a main tubular horizontally disposed sheet metal section 1 of the cross sectional shape shown in Fig. 2, said section being made upon its rear side with a longitudinal slot 2 extending the full length thereof.

At its opposite ends the main section 1 is provided with apertured bracket arms 3, 3 that are fastened by screws 4 to the frame 5 of a windshield or the like.

Within the tubular main section 1 of the frame are arranged two wiper carriers 6, 6, each of which is provided upon its exterior with recesses for holding anti-friction balls 7 which bear against longitudinal run-ways within the section 1 so that each carriage is free to be moved back and forth longitudinally within the latter.

Each carrier 6 extends laterally through the longitudinal slot 2 to the exterior of the section 1 where it has fastened to it the stem 8 of a wiper element 9, the latter bearing against the outer surface of the glass 10 of the windshield, as usual.

Within the tubular section 1 is fixed a rectangular frame 11 whose opposite side bars are made with longitudinally disposed grooves 12 upon the inner sides thereof within which is slidably mounted a rack member 13 movable longitudinally and transversely within the tubular section 1.

This rack member 13 is provided upon its bottom side and at its middle with a longitudinal row of teeth in the form of studs or pins 14 constituting a rack to co-operate with a pinion 15 provided at the upper end of the armature shaft 16 of a motor 17.

The motor 17 is fixed in position within a housing 18 which in turn is fastened to the under side of the tubular section 1 approximately midway of the length thereof.

The body of the rack member 13 is a flat plate mounted at its opposite sides within the grooves 12 and said plate is made of a width which is less than the distance between the bottoms of the grooves 12, and the difference between the width of the body of the rack member 13 and the distance between the bottoms of said slots is approximately the same as the pitch diameter of the pinion 15. It will thus be clear that the rack member 13 can be positioned within its supporting frame 11 so that the rack of teeth 14 can pass the pinion 15 at one side or the other of the latter.

The body plate of the rack member 13 is made of a length that is slightly less than one half of the length of the interior of the frame 11.

Within the rectangular frame 11, and at each end thereof is slidably arranged an abutment plate 19 that is yieldingly held against stops 20 by a spring 21. These stops 20 are shoulders provided on frame 11.

When the motor 17 is in operation the rotation of pinion 15 acts through the rack pins 14 to move the rack member 13 longitudinally until the axis of said pinion is directly opposite the pin 14 at one end of the row as shown in Fig. 3. As the rack member comes into this position its advance or forward end engages the spring pressed abutment 19 adjacent said advance end, and as the pinion 15 continues to rotate it acts to swing said endmost pin around the axis of the pinion and armature shaft 15 so as to shift that end of the rack member 13 from one side of the rectangular frame 11 into position against the opposite side thereof, whereupon the direction of movement of said member is reversed.

When the rack member 13 reaches the limit of its movement in this opposite direction its leading or advance end cooperates with the other abutment member 19 while pinion 15 effects the lateral adjustment of the opposite or rear end of the rack member whereby its motion is again reversed.

It will thus be clear that as the pinion 15 is rotated continuously in one direction it operates through the rack teeth 14 and in conjunction with the abutments 19 to reciprocate the rack member 13 and to alternately adjust the opposite ends of the rack member sidewise without the assistance of cam tracks or the like, thereby to continuously reciprocate the rack member.

Each carrier 6 is made upon its under side with a transversely disposed groove 22 that is occupied by the upper end of a stud or pin 23 provided on the rack member 13. It will therefore be clear that as said rack member is reciprocated as described the carriers 6 and wipers 9 are moved with it.

It will be clear that the wiper elements are supported wholly by the carriers 6 which in turn are movably supported on the frame of the apparatus, and that the only strains or stresses imposed upon the rack member 13 are those occasioned by the pressure longitudinally of the studs or pins 23 against the sides of the grooves 22, and therefore there is no tendency for the rack member 13 to bind or cramp in its ways.

In the form of my invention shown in Figs. 4, 5 and 6 a single wiper carrier 6a is employed to which the stem 8 of a single wiper element 9 is fastened. This carrier 6a is mounted within a tubular frame section 1a which may be connected with the frame of the windshield or the like after the manner described in connection with the frame section 1.

Within the frame section 1a is fixed or arranged a rectangular frame 11a having depending end walls 24 constructed with bearings for a continuously driven worm shaft 25 that is in engagement with a worm wheel 26 fast on a small vertical shaft 27 journaled in bearings on the carrier 6a. At its upper end the shaft 27 is made with a pinion 28 that is in engagement with a rack consisting of a row of pins 14a projecting downwardly from a floating plate or rack member 13a that is slidably mounted to move laterally, but not endwise, in grooves 12a provided upon the inner sides of the side bars of a rectangular frame 11a fixed in position within frame section 1a. At its opposite ends the plate or rack member 13a is more or less rounded as shown in Fig. 5 and is in abutting engagement with the inner sides of the end bars of frame 11a.

The worm shaft 25 may be continuously driven by an electric motor or in any other suitable fashion and as it rotates it acts through the worm wheel 26 and shaft 27 to rotate the pinion 28 so that the latter traverses the rack 14a. As the carrier 6a reaches the end of its movement in either direction it engages a stop 30 on rectangular frame 11a which positively stops the carrier in a position where the pinion 28 is slightly beyond but still in engagement with the adjacent endmost pin 14a whereupon said pin is swung laterally so as to shift that end of plate 13a to the opposite side of frame 11a thereby disposing the pinion upon the opposite side of the row of pins.

The pinion then starts traveling in the opposite direction along the opposite side of the rack and as it moves along this opposite side of the rack and reaches the limit of its movement in this reverse direction the carrier 6a comes into engagement with another stop 30 at the opposite end of frame 11a and that end of the rack plate 13a is again shifted laterally to again dispose the said pinion on the opposite side of the row of pins as will be understood. In this way the carrier 6a is continuously reciprocated within the frame section 1a thus moving the wiper 9 back and forth across the glass of the windshield.

Fig. 7 illustrates a modification of the type of wiper mechanism shown in Figs. 4, 5 and 6 wherein the rack plate 13a is disposed vertically and the other parts of the mechanism positioned to accord therewith. The operation of this form of the invention is the same as described in connection with Figs. 4, 5 and 6.

Figs. 8 to 10, inclusive, illustrate another form of my invention wherein the wiper element 9a is a horizontally disposed blade extending across the front of the windshield glass 10 and pivotally mounted upon a shaft 31 supported at its opposite ends by two vertical rack members 13a, said ends being formed with pinions 32 engaging the pins 14a of the racks.

The rack member 13a at the left of the windshield, as viewed from the front, is slidably mounted within a rectangular frame 11a so as to be movable sidewise, but not endwise, therein and this rectangular frame is fixed in position within a fixed vertically disposed tubular frame section 33 fastened by screws 4 to the frame 5 of the windshield.

The rack member 13a at the opposite side of the windshield is slidably confined within another vertically disposed frame section 34 so as to be movable sidewise, but not endwise, therein, said frame section being likewise fastened by screws 4 to the frame 5 of the windshield.

Fixedly mounted on the shaft 31 within the frame section 33 is a spiral gear 35 that meshes with another spiral gear 36 splined on a vertical shaft 37 journaled in bearings provided on frame section 33. The two shafts 31 and 37 extend loosely through a double yoke 38 which embraces both gears 35 and 36 so that if the former and its shaft are raised and lowered the gear 36 is moved therewith thus maintaining the two gears in mesh at all times.

At one end thereof the wiper element 9a is provided with a laterally extending pin or stud 42 to co-operate with a fixed cam track 39 provided on the inner adjacent side of the frame section 34, said pin or stud sliding along the inner face 40 of said track during the downward movement of the wiper element thereby to hold said element in wiping engagement with the glass 10, and along the outer face 41 during the upward movement of the wiper element thereby to hold said wiping element out of engagement with the glass.

The upper end portion of the inner face 40 of the track 39 is made as a cam surface 43 while the lower end portion of the outer face 41 of said track is made as a cam surface 44.

The shaft 37 is continuously driven in any suitable manner so as to rotate the horizontal shaft 31 continuously in the direction of the arrow, Fig. 9, thereby causing the pinions 32 to travel along the two rows of rack pins 14a, said pinions moving down one side of each row and up the opposite side thereof.

As the two pinions reach the lower ends of their racks the yoke 38 comes to rest against a stop 45 and at the same time the opposite end of the shaft 31 comes to rest against another stop 46 on frame section 34. When the descent of the shaft 31 is thus arrested the continued rotation of the two pinions 32 shifts the lower ends of the two rack members 13a sidewise thereby disposing said pinions upon the opposite sides of the two rows of pins so that said pinions climb the two racks upon the outer sides of the rows of pins. Upon reaching the tops of the racks the yoke 38 is brought to rest against a stop 47 while the opposite end of the shaft 31 is brought to rest at the same time against a stop 48 on frame section 34. Continued rotation of the pinions with the parts in these positions swings the upper ends of the two rack members 13a sidewise so as to dispose the pinions upon the opposite or rear sides of the rows of pins again whereupon said pinions start upon their downward travel.

During the downward movement of the wiper element the engagement of the stud or pin 42 with the face 40 of track 39 holds said element in a flexed condition against the glass 10 and under tension so that upon reaching and passing the lower end of the track 39 the wiper element resumes its normal straight or unflexed shape thereby disposing the pin or stud 42 so that as the wiper element starts upwardly said pin or stud rides on to the cam portion 44 of the track 39 with the result that the wiper element is held out of engagement with the glass 10 until the stud or pin passes the upper end of said track which occurs just as said wiper element reaches the limit of its upward movement. As soon as the wiper element starts downwardly the stud or pin 42 rides on to the cam surface 43 of the track thereby swinging the wiper element into position against the glass 10 where it is held by track 39 throughout the downward travel thereof.

Thus the operation of this form of my invention is characterized by a "one-way" downward wiping action of the wiper element which leaves all water, snow or the like at the bottom of the windshield.

In the modification illustrated in Fig. 11 the frame of the mechanism includes a tubular section 1b made at its bottom with a longitudinal slot 2a, said frame section being rigidly fastened at its opposite ends to the frame of the windshield as before. The wiper carrier 6b is a strap extending around the section 1b and formed upon its interior with pockets each holding an anti-friction ball 7a which has rolling engagement with the exterior of the tubular section 1b.

The opposite ends of the strap 6b are bolted to the top 49 of a motor housing 50 within which is secured an electric motor 51. The armature shaft 52 of motor 51 is disposed vertically and extends upwardly through the head 49 into the interior of the frame section 1b where it is made with a pinion 15b engaging the pins 14a of a rack member 13a mounted as illustrated in Figs. 4 and 5 so as to be adjustable sidewise but not longitudinally. The wiper element 9 of this mechanism has its stem or shank 8 fastened to the motor housing 50.

The motor 51 is continuously operated in one direction and the pinion 15b traverses the rack of pins 14a as described in connection with the form shown in Fig. 5 and, as will be clear, the head 49, housing 50, motor 51, and wiper element 9 move back and forth with the pinion 15b.

Within the housing section 1b and fixed to, but insulated from, one side wall thereof, is a trolley rail 53 extending the full length of the rack of pins 14a and a spring contact member 54 mounted upon, but insulated from, the head 49 at all times engages the trolley rail 53. The trolley rail and the contact referred to are in circuit with the motor 9, said rail being connected at one end with an electrical supply while the contact 54 is connected by a conductor, not shown, with one terminal of the motor 51, the other terminal of said motor being grounded on the frame of the mechanism. In this way electric power is supplied continuously to the motor 51 through rail 53 and contact 54.

What I claim is:—

1. In a mechanism of the class described, the combination of a fixed frame; a reciprocatory wiper carrier independently mounted on said frame and guided by the latter so as to be movable bodily back and forth thereon in a longitudinal rectilinear path; a wiper element connected with said carrier; a rack member slidably mounted on said frame; a pinion member continuously rotated in one direction and alternately engaging the opposite sides of said rack member to reciprocate one of said two members longitudinally, and a connection between said carrier and said reciprocated member through which the latter actuates said carrier.

2. In a mechanism of the class described, the combination of a fixed frame; a reciprocatory wiper carrier independently mounted on said frame and guided by the latter so as to be movable bodily back and forth thereon in a longitudinal rectilinear path; a wiper element connected with said carrier; a rack slide mounted on said frame with provision for sidewise movement only; a pinion member continuously rotated in one direction and alternately traversing the opposite sides of said rack slide so as to travel back and forth longitudinally of said frame, and a connection between said carrier and said pinion through which said pinion moves said carrier with it.

3. In a mechanism of the class described, the combination of a fixed frame; a wiper element; a rack on said frame; a pinion member continuously rotated in one direction and alternately traversing the opposite sides of said rack so as to travel back and forth longitudinally of said frame, and a connection between said carrier and said pinion through which said pinion moves said wiper element lengthwise of said frame as it traverses said rack.

4. In a mechanism of the class described, the combination of a fixed frame; a wiper carrier movably supported by said frame; a wiper element on said carrier; a toothed rack member slidably supported by said frame so as to be movable thereon sidewise only relatively to said carrier and frame to a limited extent, and a pinion engaging the teeth of said rack member and continuously rotated in one direction so as to traverse said teeth upon a circumjacent path thereby to reciprocate said carrier and wiper element.

5. In a windshield wiper, in combination, a frame; a toothed wheel member that is continuously rotated in one direction; an endless rack of teeth on said frame that is traversed by said toothed wheel member to shift one of said members bodily thereby to cause it to travel around the other member; means for guiding the bodily movable member in its travel around said other member; a wiper carrier independently and movably supported by said frame and reciprocated on a rectilinear path by said bodily movable member, and a wiper element on said carrier.

6. In a windshield wiper, in combination, a frame; a toothed wheel member on said frame that is continuously rotated in one direction; a rack on said frame that is traversed by said toothed wheel member to cause one of said members to travel bodily around the other member; means for guiding said bodily movable member in its travel around said other member; a wiper carrier independently mounted on said frame so that it is movable back and forth on a rectilinear path; means connecting said bodily movable member with said wiper carrier through which the latter is reciprocated by said bodily movable member.

7. In a mechanism of the class described, the combination of a fixed frame; a rack plate slidably mounted on said frame so as to be movable thereon sidewise to a limited extent but not endwise; a pinion engaging the teeth of said rack plate and continuously rotated in one direction so as to traverse said teeth upon a circumjacent path, a wiper element and means through which said wiper element is actuated by the bodily movement of said pinion.

Signed by me at Boston, Suffolk County, Massachusetts, this 17th day of August, 1929.

JOSEPH BORNSTEIN.